Figure 1:
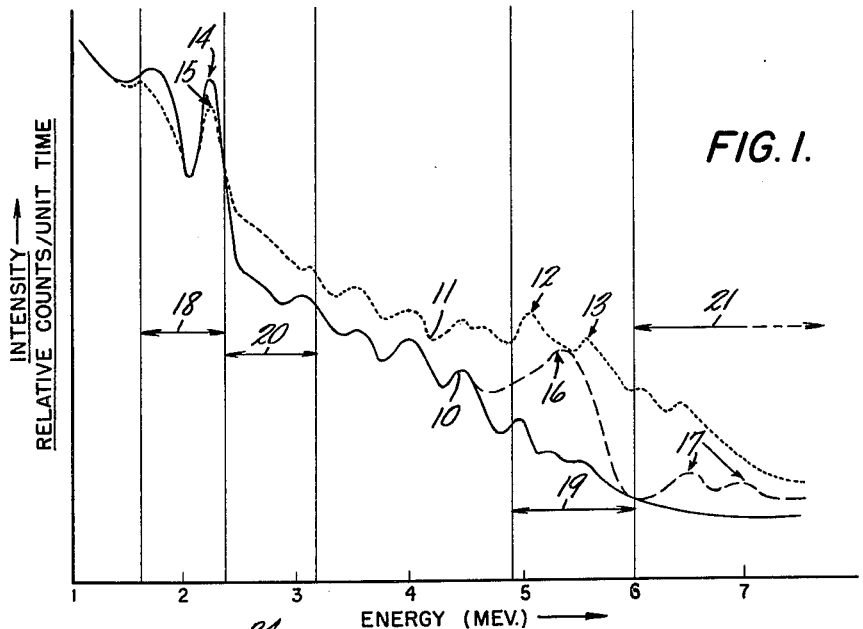

INVENTORS.
JOHN T. DEWAN &
CHARLES W. JOHNSTONE

United States Patent Office 3,108,188
Patented Oct. 22, 1963

3,108,188
NUCLEAR WELL LOGGING
John T. Dewan and Charles W. Johnstone, Houston, Tex., assignors to Schlumberger Well Surveying Corporation, Houston, Tex., a corporation of Texas
Filed Apr. 3, 1959, Ser. No. 803,898
12 Claims. (Cl. 250—83.3)

This invention relates to nuclear well logging and, more particularly, to a new and improved system for distinguishing well formations containing oil from those containing salt water.

Generally, in logging wells or boreholes to determine the content of formations through which the borehole passes, it is desirable to distinguish between various fluids, such as salt water and oil, for example, which may be contained in porous formations. Also it is important to determine the line of contact between oil bearing and salt water bearing formations. Although various systems for accomplishing this have been proposed, many of these are subject to uncertainties resulting from varying formation porosity and none of them is capable of providing a rapid and accurate log of a borehole in a convenient manner.

Accordingly, it is an object of this invention to provide a new and improved system for distinguishing materials contained in formations through which a borehole passes.

Another object of the invention is to provide a method and apparatus for determining the level of contact between formations bearing two different fluids.

A further object of the invention is to provide a method and apparatus for distinguishing salt water from oil in borehole formations.

These and other objects of the invention are attained by irradiating borehole formations with neutrons and measuring the intensity of gamma rays characteristic of neutron capture by nuclei of an element present in one of the formation fluids to be distinguished but not in the other. In order to eliminate effects due to variations in formation porosity, the intensity of gamma rays characteristic of capture by nuclei of another element present in both of the fluids is also measured and compared with the first measurement. In addition, substantially increased sensitivity to differences between these two measurements is obtained by subtracting from each measurement the intensity of background gamma rays not determinative of the presence of one fluid or the other, such as gamma rays resulting from neutron capture by various elements contained in matrix or environment.

Apparatus for carrying out these measurements comprises an instrument arranged to be lowered into a borehole and including a neutron source and a radiation detector capable of distinguishing gamma rays of different energies and generating corresponding electrical signals. An analyzer selects signals from the detector representing gamma rays characteristic of neutron capture by elements in the fluids under consideration and transmits them to comparing apparatus. In one embodiment of the invention the analyzer selects signals representing gamma rays characteristic of each of the fluids and background gamma rays of respectively greater energy and the comparer subtracts the background signals from the characteristic signals and computes the ratio of the resulting differences.

Figure 2:
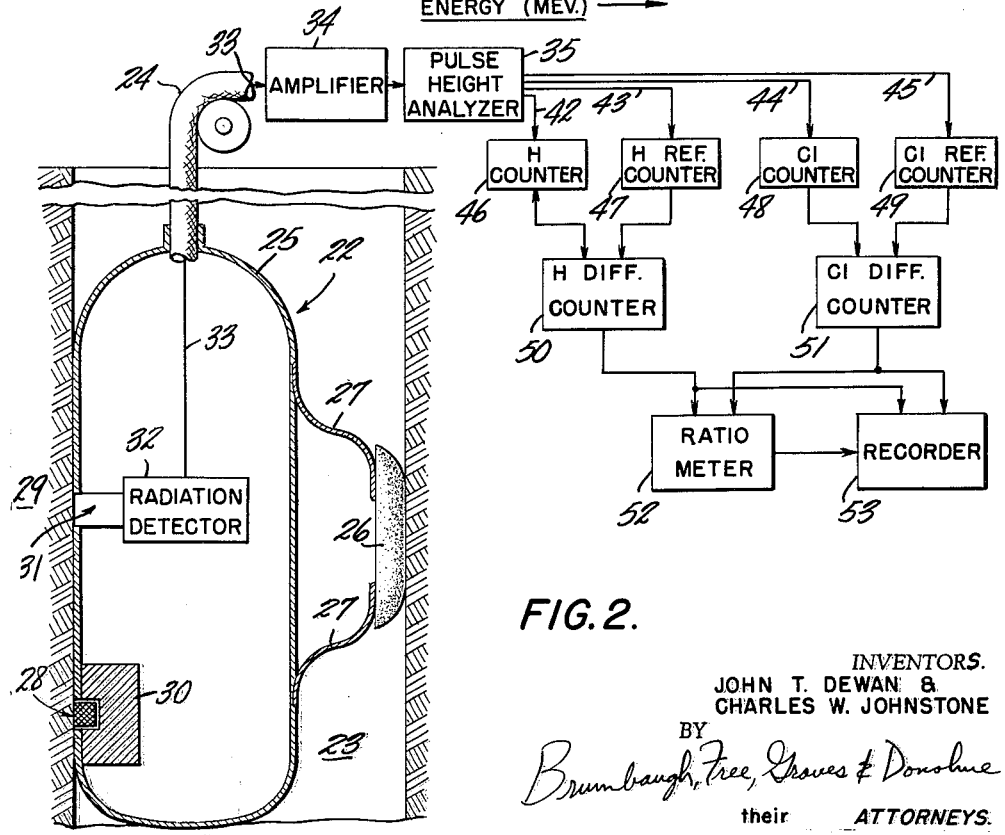

Further objects and advantages of the invention will be apparent from a reading of the following description in conjunction with the accompanying drawings in which:

FIG. 1 is a graphical illustration representing the distribution of gamma ray intensities at varous energies from oil and salt water in porous formations, as indicated by relative counting rates of a detector; and FIG. 2 is a schematic block diagram illustrating a typical apparatus for carrying out the invention.

In the representative embodiment of the invention described hereinafter, the presence of salt water in porous borehole formations is detected by irradiating the formation with neutrons and measuring the intensity of gamma rays of characteristic energy resulting from capture of neutrons by chlorine nuclei. To eliminate variations in the measured neutron capture gamma radiation from chlorine nuclei which result solely from changes in porosity, a measurement of the intensity of neutron capture gamma radiation from hydrogen nuclei present in either oil or salt water is also obtained for comparison purposes. On the other hand, since the presence of either oil or salt water in the formation is indicated by measuring the intensity of gamma rays having energy characteristic of neutron capture by hydrogen nuclei, an indication of the porosity of the formation may also be provided.

By comparing the chlorine and hydrogen measurements, oil-bearing formations are distinguished from salt water-bearing formations and by a series of such measurements made throughout the borehole the level of contact between oil and salt water-bearing formation are located. It will be readily apparent, however, that the well logging system of the invention may be utilized to distinguish the content of formations according to the presence of elements other than chlorine or hydrogen by selecting appropriate gamma ray energies for comparative intensity measurement.

In the graphical illustration of FIG. 1, a typical gamma ray energy distribution spectrum produced in a laboratory by irradiation of an oil-bearing formation is represented by the solid line graph 10, while the spectrum resulting from irradiation of a substantially identical formation partially saturated with salt water is shown by the dotted line graph 11. In this case, the formation comprises a 40% porous sand formation. As indicated in the drawing, the salt water graph 11 includes two "pair-peaks" 12 and 13 in the 5 to 6 mev. range corresponding to the increase in gamma ray intensities at these energies resulting from neutron capture by chlorine nuclei. On the other hand, the oil graph 10 contains no peaks in this range and thus it is possible to detect in the laboratory intensity differences at selected portions of the gamma ray energy spectra produced by oil and salt water contained in identical formations.

In a borehole, however, the gamma ray intensities in the 5 to 6 mev. range can vary over a range substantially larger than the difference in intensity between salt water and oil formations indicated in FIG. 1 because of variations in oil or salt water content caused by differences in formation porosity. Therefore, in order to eliminate the dependence of this measurement on the porosity of borehole formations, the intensity of gamma rays having energy characteristic of neutron capture by hydrogen nuclei, which are contained in both water and oil, is also measured according to the invention and compared with the chlorine gamma ray intensity. Provided all the hydrogen and chlorine atoms which are present in a subsurface formation are contained in the interstitial fluid and not in the formation matrix (and this is the case for most nonshaly formations), then the ratio of the capture gamma ray intensities from hydrogen and chlorine will be a measure of the salinity of the fluid and will be independent of formation porosity.

As indicated in FIG. 1, both the oil spectrum graph 10 and the salt water spectrum graph 11 have peaks 14 and 15 at 2.2 mev. corresponding to increased gamma ray intensities resulting from neutron capture by hydrogen nuclei. Thus, the advantages of the invention can be obtained effectively by taking the ratio of intensity measurements at energies in the vicinity of the peaks 12 and 13 to those in the vicinity of peaks 14 and 15. Furthermore, it will be noted that the hydrogen peak 15 of the salt water spectrum is lower than the peak 14 of the oil spectrum for the same formation, since the capture of neutrons by chlorine nuclei in salt water decreases the number of neutrons available for hydrogen capture. As a result, the difference between the ratios of chlorine and hydrogen gamma ray intensities for oil and salt water formations is accentuated.

In order to provide a borehole log sufficiently accurate to resolve differences in formation fluid salinity content while an instrument is moved through the borehole at a relatively rapid rate, the counting rates for both chlorine and hydrogen characteristic gamma rays must be kept at a relatively high level. For this reasons, gamma rays are detected within comparatively broad energy ranges surrounding each of the peaks. Thus, as shown in FIG. 1, the enregy range 18 for detection of gamma rays characteristic of hydrogen may extend from 1.6 to 2.4 mev., for example, while an energy range 19 from 4.9 to 6.0 mev. is utilized for capture of gamma rays from chlorine nuclei.

Although oil-bearing formations can generally be distinguished from water-bearing formations in a borehole in the manner described above, in many cases the background gamma radiation in the vicinity of the hydrogen and chlorine peaks is sufficiently high to reduce the difference between the ratios of gamma ray intensities at the hydrogen and chlorine peaks to a value approaching the probable error of measurement. For example, gamma ray spectra for a limestone formation show a peak 16 resulting from neutron capture by calcium nuclei approximately halfway between the two chlorine peaks 12 and 13. Similarly characteristic gamma rays produced by neutron capture by iron nuclei contained in a steel pressure housing surrounding a borehole instrument for example, introduces further peaks 17 in the 7 mev. vicinity. Because of the nature of gamma ray interactions in a scintillation crystal, any such peaks, even though they may be outside the primary intervals of interest, contribute to the background in all channels below the energy of the aforementioned peak.

Accordingly, in order to make the ratio of gamma ray intensities at energies characteristic of hydrogen and chlorine even more sensitive to the presence of chlorine, a background or reference energy range may be selected for either or both of the ranges of interest and the gamma ray intensities in these energy ranges or some fraction thereof are subtracted from the intensities detected in the corresponding hydrogen or chlorine range.

In the typical example illustrated in FIG. 1, a reference range 20 extending from 2.4 to 3.2 mev. is utilized as a background for the hydrogen gamma ray energy range 18. It will be readily apparent from an examination of the graphs that variations in formation porosity produce changes in the difference between the counting rates in the two energy ranges 18 and 20 which are much larger than the change in the intensity within the hydrogen channel 18 alone. Similarly, a reference energy range 21 comprising all the energies above 6.0 mev. may be selected for comparison with the chlorine gamma ray energy range 19. This range includes the peaks 17 produced by neutron capture in iron nuclei content in the instrument housing or in the borehole casing, for example. Subtraction of the counting rate or some fraction thereof in this range from that in the chlorine range 19 produces a measurement highly sensitive to variations in chlorine content of the borehole formation.

Therefore, by comparing the difference in counting rate between the hydrogen gamma ray energy range 18 and its reference range 20 with the difference in counting rate between the chlorine energy range 19 and its reference range 21, a highly sensitive indication is obtained of the presence in a formation of chlorine and, therefore, salt water independently of formation porosity. Preferably, this comparison is made by detecting the ratio of these differences. Furthermore, by recording a continuous log of a borehole in this manner, oil bearing formations are distinguished from salt water bearing formations and contact levels between two such formations can be located accurately even when high background counting rates are encountered in the borehole.

Representative apparatus for carrying out the invention comprises a borehole instrument 22 arranged to be lowered into a borehole 23 at the end of a cable 24 in the usual manner, as shown in FIG. 2, the instrument 22 being encased in a steel pressure housing 25, for example. If desired, the borehole instrument 22 may be held in contact with the borehole wall at one side of the borehole 23 in any well known manner, such as by a pad member 26 urged against the opposite side of the borehole wall by springs 27 although centering means (not shown) holding the instrument at the center of the borehole may be used instead.

If the instrument 22 is held against the wall of the borehole, as illustrated, a neutron source 28 is positioned at the side of the housing 25 which is in contact with the borehole wall to irradiate the adjacent borehole formation 29 with neutrons, the source 28 being contained within appropriate shielding material 30. Otherwise, with a centered instrument, the source may be mounted centrally to irradiate the entire wall evenly. Preferably, the source 28 comprises a conventional polonium-beryllium or actinium-beryllium neutron source of several curies strength, for example, but any other suitable neutron sources can readily be substituted. Thus, for example, a pulsed-neutron source of the type described in copending United States application of Goodman, Serial No. 441,976, might be utilized instead of the polonium-beryllium source.

At a point longitudinally spaced from the neutron source 28, the sensitive element 31 of a radiation detector 32 is positioned in the housing 25 to receive gamma rays from the formation 29. If the instrument is held against the side wall, the sensitive element 31 is preferably adjacent the wall, as illustrated. The detector 32 may be of any well known type responsive to gamma rays and adapted to produce a pulse signal in response to each gamma ray detected having an amplitude representative of the energy of the gamma ray. For example, it may comprise a conventional scintillation spectrometer utilizing a sodium iodide crystal as the gamma ray sensitive element 31 along with a photomultiplier tube positioned to detect each flash of light in the crystal resulting from incidence of a gamma ray to generate a pulse corresponding thereto. In addition, to prevent actuation of the detector 32 by incidence of neutrons on the crystal, the sensitive element 31 may be encased in a boron carbide sheath to block the neutrons and permit gamma rays to pass. If desired, the detector 32 may also include suitable equipment for amplifying each pulse but it will be appreciated that amplification at this stage must be accomplished with high amplitude fidelity. Also, in order to reduce the counting rate capacity required of subsequent equipment, the amplifier can be biased in the usual manner to respond only to pulses corresponding to gamma rays having energy greater than a predetermined value, for example, 1 mev.

Output pulses from the detector 32 are transmitted over a conductor 33 in the cable 24 to the surface of the earth where they may be amplified by an amplifier 34, if desired, before being applied to a conventional pulse height analyzer 35. Inasmuch as the amplitude of each pulse represents the energy of a corresponding gamma ray, the amplifier 34 must be capable of high fidelity reproduction, as pointed out above.

In the typical embodiment of the invention described herein, the pulse height analyzer 35 selects pulses according to their amplitude and applies them through four conductors 42, 43, 44, and 45 to four pulse counters 46, 47, 48, and 49 corresponding to the four different gamma ray energy ranges described above. Thus, the conductor 42 receives pulses from the analyzer representing gamma rays in the range 1.6 to 2.4 mev. corresponding to the hydrogen gamma ray energy range 18 of FIG. 1 and transmits them to the counter 46, while the conductor 43 receives the pulses representing gamma rays in the energy range 2.4 to 3.2 mev. comprising the hydrogen reference range 20 and carries them to the counter 47. Similarly, the conductors 44 and 45 carry pulse information representing gamma ray intensities in the chlorine range 19 from 4.9 to 6.0 mev. and the chlorine reference range 21 above 6.0 mev., to the two counters 48 and 49, respectively.

Each of the counters 46–49 may be of the cumulative type resettable at unit time intervals and adapted to accumulate the number of pulses received during each time interval and provide an output signal representing the total at the end of the time interval. On the other hand, counting rate meters comprising, for example, storage capacitors shunted by bleeder resistors to provide a constant rate of decay may be utilized to generate a continuous output voltage representing the rate of receipt of input pulses.

In order to subtract the gamma ray intensities in the reference energy ranges 20 and 21 from those in the hydrogen and chlorine energy ranges 18 and 19, a suitable difference counter 50 receives the output signals from the hydrogen and hydrogen reference channel counters 46 and 47 while a similar difference counter responds to output signals from the chlorine and chlorine reference counters 48 and 49. Each of these counters is arranged in any well known manner to generate an output signal representing the difference between its input signals and may be responsive to cumulative counter outputs to compute the difference at the end of each time interval or, if counting rate meters are utilized, the difference counters may be arranged to provide a continuous output signal. An appropriate ratio meter 52 receives the output signals from the two difference counters 50 and 51 and provides an output signal representing the ratio of the two differences. In order to provide a continuous log of a borehole, this signal is applied to a conventional recorder 53 linked to drive apparatus (not shown) for the cable 24, thereby providing a relation between the ratio signal and the depth of the instrument 22 in the borehole. If desired, the recorder 53 may also be connected in the manner illustrated to record the difference signal from each of the counters 50 and 51 separately.

In operation, the formation 29 is irradiated with neutrons from the source 28 while the instrument 22 is drawn upwardly through the borehole 23. Gamma rays of various energies, including those resulting from neutron capture by chlorine in salt water and hydrogen in salt water or oil in the formation, actuate the detector 32 to produce pulse signals having amplitudes corresponding to these energies. These pulse signals are transmitted to the surface of the earth by the conductor 33 and the pulses representing gamma rays within the energy ranges 18, 20, 19, and 21 of FIG. 1 are selected by the pulse height analyzer 35 and transmitted through the separate channels 42, 43, 44 and 45 to actuate the corresponding counters 46, 47, 48, and 49. The ratio meter 52 computes the ratio of the difference between the counting rates of the hydrogen channel 42 and the hydrogen reference channel 43 to the difference between the counting rates in the chlorine channel 44 and the chlorine reference channel 45, thereby providing a highly sensitive indication of the presence of chlorine to distinguish salt water bearing formations from oil bearing formations. The location of contact levels between such formations is readily determinable from the continuous log of these differences and their ratio as recorded by the recorder 53 while the instrument 22 is drawn through the borehole.

Although the invention has been described herein with reference to a specific embodiment, many modifications and variations therein will readily occur to those skilled in the art. For example, instead of selecting the peak 14 representing the intensity of capture of gamma rays from hydrogen which is present in both salt water and oil for comparison with the chlorine capture gamma ray intensity, the intensity of gamma rays produced by capture of neutrons in other nuclei present only in oil might be measured and a function of this intensity and the chlorine gamma ray intensities taken as a measure of formation salinity. Accordingly, all such variations and modifications are included within the intended scope of the invention as defined by the following claims.

We claim:

1. Apparatus for determining the fluid content of a porous formation in a borehole comprising means for irradiating the borehole formation with neutrons, means for detecting gamma rays radiated from the formation and generating corresponding signals representing the energies of the detected gamma rays, means for measuring the intensity of signals corresponding to gamma rays within a restricted energy range resulting from neutron capture by nuclei of an element in the fluid, means for measuring the intensity of signals corresponding to gamma rays within another restricted energy range resulting from neutron capture by nuclei of another element which is present in proportion to the porosity of the formations, means for measuring the intensity of signals corresponding to background radiation in a selected energy range and subtracting it from the intensity of signals corresponding to gamma rays resulting from neutron capture by nuclei of at least one of the elements, and means for comparing the two resulting intensities.

2. Apparatus for distinguishing between two fluids contained in porous formations in a borehole comprising means for irradiating a borehole formation with neutrons, means for detecting gamma rays from the formation and generating corresponding signals representing the energies of the detected gamma rays, means for measuring the intensity of the signals corresponding to gamma rays within a restricted energy range resulting from neutron capture by nuclei of an element in one of the fluids, means for measuring the intensity of the signals corresponding to gamma rays within another restricted energy range resulting from neutron capture by nuclei of another element in the other fluid, means for measuring the intensity of signals corresponding to background radiation in a selected energy range and subtracting it from the intensity of signals corresponding to gamma rays resulting from neutron capture by nuclei of at least one of the elements, and means for comparing the two resulting intensities.

3. Apparatus for determining the content of a fluid in a porous formation in a borehole comprising means for irradiating the borehole formation with neutrons, means for detecting gamma rays from the formation and generating corresponding electrical signals representing the energies of the detected gamma rays, means for measuring the intensity of signals corresponding to gamma rays resulting from neutron capture by nuclei of an element in the fluid, means for measuring the intensity of signals corresponding to gamma rays resulting from neutron capture by nuclei of another element which is present in proportion to the porosity of the formation, means for measuring the intensity of signals corresponding to background radiation in a selected energy range and subtracting it from the intensity of signals corresponding to gamma rays resulting from neutron capture by nuclei of at least one of the elements, and means for comparing the resulting intensities.

4. Apparatus for determining the content of a fluid in a porous formation in a borehole comprising means for irradiating the borehole formation with neutrons, means for detecting gamma rays from the formation and generating corresponding electrical signals representing the energies of the detected gamma rays, means for measuring the intensity of signals corresponding to gamma rays resulting from neutron capture by nuclei of an element in the fluid, means for measuring the intensity of signals corresponding to gamma rays resulting from neutron capture by nuclei of another element which is present in proportion to the porosity of the formation, means for measuring the intensity of signals corresponding to background radiation in a selected energy range and subtracting it from the intensity of signals corresponding to gamma rays resulting from neutron capture by nuclei of one of the elements, means for measuring the intensity of signals corresponding to background radiation in another selected energy range and subtracting it from the intensity of signals corresponding to gamma rays resulting from neutron capture by nuclei of the other element, and means for comparing the two intensity differences.

5. Apparatus for determining the content of a fluid in a porous formation in a borehole comprising means for irradiating the borehole formation with neutrons, means for detecting gamma rays from the formation and generating corresponding electrical signals representing the energies of the detected gamma rays, means for measuring the intensity of signals corresponding to gamma rays resulting from neutron capture by nuclei of an element in the fluid, means for measuring the intensity of signals corresponding to gamma rays resulting from neutron capture by nuclei of another element which is present in proportion to the porosity of the formation, means for measuring the intensity of signals corresponding to background radiation in a selected energy range and subtracting it from the intensity of signals corresponding to gamma rays resulting from neutron capture by nuclei of at least one of the elements and means for taking the ratio of the resulting intensities.

6. Apparatus for determining the content of a fluid in a porous formation in a borehole comprising means for irradiating the borehole formation with neutrons, means for detecting gamma rays from the formation and generating corresponding electrical signals representing the energies of the detected gamma rays, means for measuring the intensity of signals corresponding to gamma rays resulting from neutron capture by nuclei of an element in the fluid, means for measuring the intensity of signals corresponding to gamma rays resulting from neutron capture by nuclei of another element which is present in proportion to the porosity of the formation, means for measuring the intensity of signals corresponding to background radiation in a selected energy range and subtracting it from the intensity of signals corresponding to gamma rays resulting from neutron capture by nuclei of one of the elements, measuring the intensity of signals corresponding to background radiation in another selected energy range and subtracting it from the intensity of signals corresponding to gamma rays resulting from neutron capture by nuclei of the other element, and means for taking the ratio of the two intensity differences.

7. Apparatus for determining the salt water content of a porous formation in a borehole comprising means for irradiating the borehole formation with neutrons, means for detecting gamma rays from the formation and generating corresponding electrical signals representing the energy of the detected gamma rays, means for measuring the intensity of signals corresponding to gamma rays resulting from neutron capture by chlorine nuclei, means for measuring the intensity of signals corresponding to gamma rays resulting from neutron capture by nuclei of another element contained by the porous formation, means for measuring the intensity of the signals representing gamma radiation in a selected energy range relatively independent of gamma rays from nuclei of chlorine and the other element, means for subtracting this intensity from one of the other intensities, and means for comparing the resulting difference with the remaining intensity.

8. Apparatus for distinguishing oil-bearing formations from salt water-bearing formations in a borehole comprising means for irradiating a borehole formation with neutrons, means for detecting gamma rays from the formation and generating corresponding electrical signals representing the energies of the detected gamma rays, means for measuring the intensity of the signals corresponding to gamma rays resulting from neutron capture by chlorine nuclei, means for measuring the intensity of the signals corresponding to neutron capture by hydrogen nuclei, means for measuring the intensity of signals representing gamma radiation in a selected energy range relatively independent of gamma rays from chlorine and hydrogen, means for subtracting this intensity from one of the other intensities, and means for comparing the resulting difference with the remaining intensity.

9. Apparatus for distinguishing fluids contained in porous borehole formations comprising a neutron source for irradiating the borehole formations with neutrons, detector means responsive to gamma rays to generate electrical signals corresponding to the energies of the gamma rays detected, analyzer means for segregating the electrical signals into a plurality of channels representing a plurality of gamma ray energy ranges, first channel means receiving signals from the analyzer representing gamma rays in an energy range corresponding to neutron capture by nuclei of an element in a fluid to be distinguished, second channel means receiving signals from the analyzer representing gamma rays corresponding to neutron capture by nuclei of an element in another fluid, third channel means receiving signals representing background radiation in a selected energy range, means for subtracting the intensity of these signals from the intensity of signals received by one of the first two channel means, and means for comparing the resulting difference with the intensity received by the remaining channel means.

10. Apparatus for distinguishing fluids contained in porous borehole formations comprising a neutron source for irradiating the borehole formations with neutrons, detector means responsive to gamma rays to generate electrical signals corresponding to the energies of the gamma rays detected, analyzer means for segregating the electrical signals into a plurality of channels representing a plurality of gamma ray energy ranges, first channel means receiving signals from the analyzer representing gamma rays in an energy range corresponding to neutron capture by nuclei of an element in a fluid to be distinguished, second channel means receiving signals from the analyzer representing gamma rays corresponding to neutron capture by nuclei of an element in another fluid, third channel means receiving signals representing background radiation in a selected energy range, means for subtracting the intensity of these signals from the intensity of signals received by one of the first two channel means, fourth channel means receiving signals representing background radiation in another energy range, means for subtracting the intensity of these signals from the intensity of signals in the other of the first two channel means, and means for comparing the resulting differences in intensity.

11. Apparatus for distinguishing salt water from oil in porous borehole formations comprising a neutron source for irradiating the borehole formations with neutrons, detector means responsive to gamma rays to generate electrical signals corresponding to the energies of the gamma rays detected, analyzer means for segregating the electrical signals into a plurality of channels representing a plurality of gamma ray energy ranges, first channel means receiving signals from the analyzer representing gamma rays in an energy range corresponding to neutron capture by nuclei of chlorine, second channel means receiving signals from the analyzer representing gamma rays in an energy range corresponding to neutron capture by hydrogen nuclei, third channel means receiving signals representing background radiation in a selected energy range, means for subtracting the intensity of these signals from the intensity of signals received by one of the first two channel means, and means for comparing the resulting intensity difference with the intensity received by the remaining channel means.

12. Apparatus for distinguishing salt water from oil in porous borehole formations comprising a neutron source for irradiating the borehole formations with neutrons, detector means responsive to gamma rays to generate electrical signals corresponding to the energies of the gamma rays detected, analyzer means for segregating the electrical signals into a plurality of channels representing a plurality of gamma ray energy ranges, first channel means receiving signals from the analyzer representing gamma rays in an energy range corresponding to neutron capture by nuclei of chlorine, second channel means receiving signals from the analyzer representing gamma rays in an energy range corresponding to neutron capture by hydrogen nuclei, third channel means receiving signals representing background radiation in a selected energy range, means for subtracting the intensity of these signals from the intensity of signals received by one of the first two channel means, fourth channel means receiving signals representing background radiation in another energy range, means for subtracting the intensity of these signals from the intensity of signals received by the other of the first two channel means, and means for comparing the resulting intensity differences.

References Cited in the file of this patent

UNITED STATES PATENTS

| Re. 24,383 | McKay | Oct. 29, 1957 |
| 2,776,378 | Youmans | Jan. 1, 1957 |
| 2,785,314 | Grahame | Mar. 12, 1957 |
| 2,905,826 | Bonner et al. | Sept. 22, 1959 |
| 2,922,886 | Putman | Jan. 26, 1960 |